United States Patent [19]

Olson et al.

[11] Patent Number: 4,491,508

[45] Date of Patent: Jan. 1, 1985

[54] METHOD OF PREPARING CURABLE COATING COMPOSITION FROM ALCOHOL, COLLOIDAL SILICA, SILYLACRYLATE AND MULTIACRYLATE MONOMER

[75] Inventors: Daniel R. Olson, Schenectady; Karen K. Webb, Ballston Lake, both of N.Y.

[73] Assignee: General Electric Company, Schenectady, N.Y.

[21] Appl. No.: 459,905

[22] Filed: Jan. 21, 1983

Related U.S. Application Data

[62] Division of Ser. No. 269,122, Jun. 1, 1981, Pat. No. 4,455,205.

[51] Int. Cl.$^3$ .................... C08F 230/08; C08F 2/50; C08G 77/18
[52] U.S. Cl. .................... 204/159.13; 528/26; 528/32; 528/39; 526/279; 428/412; 427/54.1; 524/806
[58] Field of Search .................... 204/159.13; 528/26, 528/32, 39; 526/279; 524/806

[56] References Cited

U.S. PATENT DOCUMENTS

| | | | |
|---|---|---|---|
| 3,944,702 | 3/1976 | Clark | 428/391 |
| 4,027,073 | 5/1977 | Clark | 428/412 |
| 4,198,465 | 4/1980 | Moore et al. | 428/409 |
| 4,246,038 | 1/1981 | Vaughn et al. | 106/287.16 |
| 4,315,970 | 2/1982 | McGee | 428/412 |
| 4,348,462 | 9/1982 | Chung | 428/412 |

*Primary Examiner*—Melvyn I. Marquis
*Assistant Examiner*—Arthur H. Koeckert
*Attorney, Agent, or Firm*—William A. Teoli; James C. Davis, Jr.; James Magee, Jr.

[57] ABSTRACT

UV curable coating compositions are provided based on the use of photoinitiator with the hydrolysis product of silylacrylate and aqueous colloidal silica. The UV curable silicone coating compositions also can contain polyfunctional acrylate. The UV curable hardcoat composition can be applied onto various substrates, for example, a polycarbonate substrate, and thereafter cured under UV radiation to produce adherent and abrasion resistant coated articles.

5 Claims, No Drawings

METHOD OF PREPARING CURABLE COATING COMPOSITION FROM ALCOHOL, COLLOIDAL SILICA, SILYLACRYLATE AND MULTIACRYLATE MONOMER

This application is a division of application Ser. No. 269,122, filed 6/1/81, now U.S. Pat. No. 4,455,205.

CROSS REFERENCE TO RELATED APPLICATIONS

Reference is made to the copending applications of Rack H. Chung, Ser. No. 217,719, filed Dec. 16, 1980, now abandoned, for Abrasion Resistant Ultraviolet Light Curable Hardcoating Compositions, Ser. No. 129,297, filed Mar. 11, 1980, Ser. No. 167,622, filed July 11, 1980, now U.S. Pat. No. 4,348,462 and Ser. No. 204,146, filed Nov. 5, 1980, now abandoned.

BACKGROUND OF THE INVENTION

Prior to the present invention, thermoplastic substrates, for example, polycarbonate articles, were treated with a photocurable acrylic coating composition, as shown in Moore et al., U.S. Pat. No. 4,198,465, assigned to the same assignee as the present invention. Although the use of cured polyacrylate coatings provided durable mar resistant and chemical resistant coatings, the ability of the cured polyacrylic coating often did not satisfy the abrasion resistant standards required in many applications.

As shown by Clark, U.S. Pat. No. 4,027,073, an acidic dispersion of colloidal silica in a hydroxylated silsesquioxane provides heat curable mixtures which result in valuable transparent abrasion resistant coatings on a variety of thermoplastic substrates. It was found, however, that the cure of the hydroxylated silsesquioxane binder resin often requires several hours, or even days to achieve acceptable mar resistant properties. Efforts to accelerate the cure speed of the aforementioned silsesquioxane colloidal silica coating compositions or impart improved abrasion resistance to the previously described polyacrylate coatings, have been unsuccessful.

The present invention is based on the discovery that a UV curable substantially solvent-free coating composition, based on the use of a UV photoinitiator, for example, 60a,α-diethoxyacetophenone, can be used in combination with a silyl acrylate of the formula, $$(R^1O)_{4-a-b}\overset{(R)_a}{\underset{|}{Si}}\text{---}[C(R^2)_2\text{---}CH\text{---}R^3\text{---}O\text{---}\overset{O}{\underset{\|}{C}}\text{---}\overset{R^2}{\underset{|}{C}}=C(R^2)_2]_b, \quad (1)$$

and aqueous colloidal silica, and optionally with acrylic monomer of the formula, $$[(R^2)_2C=CR^2\text{---}\overset{O}{\underset{\|}{C}}\text{---}O]_nR^4 \quad (2)$$

to provide a UV curable organopolysiloxane hardcoat composition curable to an adherent abrasion resistant coating in several seconds or less, where R is a $C_{(1-13)}$ monovalent radical, $R^1$ is a $C_{(1-8)}$ alkyl radical, $R^2$ is selected from hydrogen and R radicals and mixtures thereof, $R^3$ is a divalent $C_{(1-8)}$ alkylene radical and $R^4$ is a polyvalent organic radical, a is a whole number equal to 0 to 2 inclusive, b is an integer equal to 1-3 inclusive, and the sum of a+b is equal 1 to 3 inclusive, n is an integer having a value of 2 to 4 inclusive.

STATEMENT OF THE INVENTION

There is provided by the present invention, substantially solvent-free UV curable organopolysiloxane hardcoat compositions comprising by weight
- (A) 1% to 60% of colloidal silica,
- (B) 1% to 50% of material resulting from the hydrolysis of silyl acrylate of formula (1),
- (C) 25% to 90% of acrylate monomer of formula (2) and
- (D) 0.1% to 5% of a UV photoinitiator, where the sum of (A), (B), (C) and (D) is 100%.

R of formula (1) is more particularly selected from $C_{(1-8)}$ alkyl, such as methyl, ethyl, propyl, butyl, etc.; aryl radicals and halogenated aryl radicals, for example, phenyl, tolyl, xylyl, naphthyl, chlorophenyl, etc.; radicals included within $R^1$ are, for example, all of the $C_{(1-8)}$ alkyl radicals included within R; radicals included within $R^2$ are hydrogen and the same or different radicals included within R. Divalent alkylene radicals included within $R^3$ are, for example, methylene, ethylene, trimethylene, tetramethylene, etc. Divalent organic radicals included within $R^4$ are $R^3$ radicals, branched $C_{(2-8)}$ alkylene radicals, branched halogenated $C_{(2-8)}$ alkylene radicals, branched hydroxylated $C_{(2-8)}$ alkylene radicals, branched acrylate radicals, $C_{(6-13)}$ arylene radicals, for example, phenylene, tolylene, naphthylene, etc., halogenated $C_{(6-13)}$ arylene radicals, etc.

Polyfunctional acrylate monomers included within formula (2) are, for example, diacrylates of the formulas, $$\overset{CH_3}{\underset{|}{CH_2=CCOO}}\text{---}CH_2\text{---}OOC\overset{CH_3}{\underset{|}{C=CH_2}},$$

$$CH=CHCOO\text{---}CH_2\text{---}CH_2\text{---}OOCCH=CH_2,$$
$$CH_2=CHCOO\text{---}CH_2\text{---}CHOHCH_2\text{---}OOCCH=CH_2,$$

$$\overset{CH_3}{\underset{|}{CH_2=CCOO}}\text{---}(CH_2)_6\text{---}OOC\overset{CH_3}{\underset{|}{C=CH_2}},$$

$$CH=CHCOO\text{---}CH_2\text{---}CH_2\text{---}\overset{OOCH=CH_2}{\underset{|}{CH}}\text{---}CH_3,$$

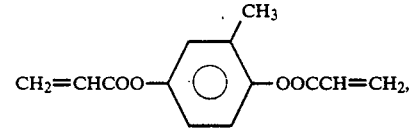

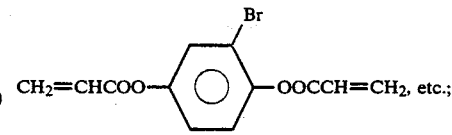

triacrylates of the formulas, $$CH_2=CHCOO\text{---}CH_2CH_2\overset{OOCCH=CH_2}{\underset{|}{CH}}CH_2\text{---}OOCCH=CH_2,$$

-continued $$CH_2=CHCOO-CH_2$$
$$CH_2=CHCOO-CH_2-\underset{|}{\overset{|}{C}}-CH_2-CH_3,$$
$$CH_2=CHCOO-CH_2$$

$$CH_2=CHCOO-CH_2-\underset{|}{\overset{|}{\underset{CH_2-OOCCH=CH_2}{C}}}-CH_2-OOCCH=CH_2,$$

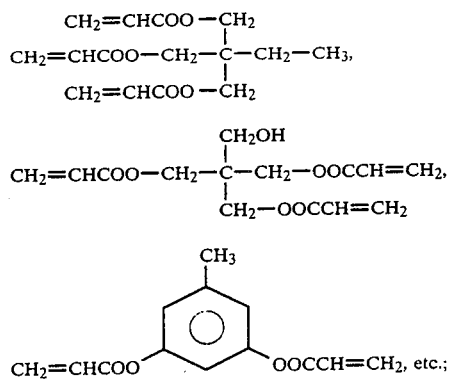

tetraacrylates of the formulas, $$CH_2=CHCOOCH_2$$
$$CH_2=CHCOO-CH_2-\underset{|}{\overset{|}{CH}}-CH_2-OOCCH=CH_2,$$
$$CH_3=CHCOOCH_2$$

$$CH_2=CHCOO-CH_2\underset{|}{\overset{OH}{CH}}-CH_2\underset{|}{CH}-OOCCH=CH_2, \text{etc.}$$
$$CH_2=CHCOO-CH_2 \qquad CH_2-OOCCH=CH_2$$

Included within the silyl acrylates of formula (1) are compounds having the formulas,
$CH_2=CCH_3CO_2-CH_2CH_2-Si(OCH_2CH_3)_3$,
$CH_2=CHCO_2-CH_2CH_2-Si(OCH_3)_3$,
$CH_2=CCH_3CO_2-CH_2CH_2CH_2-Si(OCH_2CH_3)_3$,
$CH_2=CHCO_2-CH_2CH_2CH_2-Si(OCH_2CH_3)_3$,
$CH_2=CCH_3CO_2-CH_2CH_2CH_2-Si(OCH_3)_3$,
$CH_2=CHCO_2-CH_2CH_2CH_2-Si(OCH_3)_3$,
$CH_2=CCH_3CO_2-CH_2CH_2CH_2-Si(OCH_2CH_3)_3$,
$CH_2=CHCO_2-CH_2CH_2CH_2-Si(OCH_2CH_3)_3$,
$CH_2=CCH_3CO_2-CH_2CH_2CH_2CH_2-Si(OCH_3)_3$,
$CH_2=CHCO_2-CH_2CH_2CH_2CH_2-Si(OCH_3)_3$,
$CH_2=CCH_3CO_2-CH_2CH_2CH_2CH_2-Si(OCH_2CH_3)_3$,
$CH_2=CHCO_2-CH_2CH_2CH_2CH_2-Si(OCH_2CH_3)_3$,
etc.

Another of the necessary ingredients of the hardcoat composition of the present invention is colloidal silica. Colloidal silica is a dispersion of submicron-sized silica ($SiO_2$) particles in an aqueous or other solvent medium. It is this polysiloxane backbone which provides the hardcoat composition with many of the advantages inherent in silicone products such as a wide-ranging resistance to environmental extremes.

Dispersions of colloidal silica are available from chemical manufacturers such as DuPont and Nalco Chemical Company. Colloidal silica is available in either acidic or basic form. However, for purposes of the present invention it is preferable that the acidic form be utilized. It has been found that superior hardcoat properties can be achieved with acidic colloidal silica (i.e. dispersions with low sodium content). Alkaline colloidal silica also may be converted to acidic colloidal silica with additions of acids such as HCl or $H_2SO_4$ along with high agitation.

An example of a satisfactory colloidal silica for use in these coating compositions is Nalcoag 1034A, available from Nalco Chemical Company, Chicago, Ill. Nalcoag 1034A is a high purity, acidic pH aqueous colloidal silica dispersion having a low $Na_2O$ content, a pH of approximately 3.1 and an $SiO_2$ content of approximately 34 percent by weight. In the examples given below the weight in grams or parts by weight of the colloidal silica includes its aqueous medium. Thus, for example, 520 grams of Nalcoag 1034A colloidal silica represents, approximately, 177 grams of $SiO_2$ by weight. It should be noted, however, that the aqueous medium is utilized as a convenient way of handling the colloidal silica and does not form a necessary part of the hardcoat compositions of the present invention. In fact, it is to be emphasized that these coating compositions find particularly beneficial utility in the fact that they may be part of a solventless system.

The term colloidal silica is intended to represent a wide variety of finely divided $SiO_2$ forms which can be utilized to form the hardcoat compositions of the present invention without the necessity of undue experimentation. Further description can be found in U.S. Pat. No. 4,027,073.

Although the coating compositions may contain only one of said polyfunctional acrylate monomers, preferred coating compositions contain a mixture of two polyfunctional monomers, preferably a diacrylate and a triacrylate. In addition, minor amounts of mono-acrylate can be used in particular instances. Further, the UV curable compositions of the present invention can contain nonacrylic UV curable aliphatically unsaturated organic monomers in amounts up to 50% by weight of the UV curable hardcoat compositions which include, for example, such materials as N-vinyl pyrrolidone, styrene, etc.

When the coating compositions contain a mixture of acrylate monomers, it is preferred that the ratio, by weight, of the diacrylate to the triacrylate be from about 10/90 to about 90/10. Exemplary mixtures of diacrylate and triacrylates include mixtures of hexanediol diacrylate with pentaerythritol triacrylate, hexanediol diacrylate with trimethylolpropane triacrylate, diethyleneglycol diacrylate with pentaerythritol triacrylate, and diethyleneglycol diacrylate with trimethylolpropane triacrylate.

While the corresponding coatings may likewise contain the ultraviolet light reaction product of a single polyfunctional acrylate monomer, coatings containing the photoreaction product of two polyfunctional acrylate monomers, preferably a diacrylate and triacrylate, are preferred.

The photocurable coating compositions also contain a photosensitizing amount of photoinitiator, i.e., an amount effective to effect the photocure in a non-oxidizing atmosphere, for example, nitrogen, of the coating composition. Generally, this amount is from about 0.01% to about 10% by weight, and preferably from about 0.1% to about 5% by weight of the photocurable coating composition.

As shown in the copending application of Rack Chung, Ser. No. 217,719, filed Dec. 16, 1980, now abandoned certain blends of ketone-type and hindered amine type materials are photoinitiators which are effective for crosslinking the above described coating compositions in air to form suitable hard coatings upon exposure to UV radiation. As taught by Chung, it is preferred that the ratio, by weight, of the ketone compound to the hindered amine compound be from, approximately, 80/20 to 20/80. Ordinarily, 50/50 or 60/40 mixtures are quite satisfactory.

Other ketone-type photoinitiators which preferably are used in a nonoxidizing atmosphere, such as nitrogen, are those selected from the group consisting of:
benzophenone, and other acetophenones,
benzil, benzaldehyde and 0-chlorobenzaldehyde,
xanthone,
thioxanthone,
2-clorothioxanthone,
9,10-phenanthrenenquinone,
9,10-anthraquinone,
methylbenzoin ether,
ethylbenzoin ether,
isopropyl benzoin ether,
$\alpha,\alpha$-diethoxyacetophenone,
$\alpha,\alpha$-dimethoxyacetophenone,
1-phenyl-1,2-propanediol-2-o-benzoyl oxime, and
$\alpha,\alpha$-dimethoxy-$\alpha$-phenylacetopheone.

The coating compositions of the instant invention may also optionally contain UV absorbers or stabilizers such as resorcinol monobenzoate, 2-methyl resorcinol dibenzoate, etc. The stabilizers can be present in an amount, based upon the weight of the coating composition, exclusive of any additional solvent which may optionally be present, of from about 0.1 to 15 weight percent, preferable from about 3 to about 15 weight percent. The UV cured coating composition can contain from about 1 to about 15% by weight of stabilizers based on the weight of UV curable coating composition.

The coating compositions of the present invention may also optionally contain various flatting agents, surface active agents, thixotropic agents, UV light stabilizers and dyes. All of these additives and the use thereof are well known in the art and do not require extensive discussions. Therefore, only a limited number will be referred to, it being understood that any of these compounds can be used so long as they do not deleteriously affect the photocuring of the coating compositions and do not adversely affect the non-opaque character of the coating.

The various surface-active agents, including anionic, cationic and nonionic surface-active agents are described in Kirk-Othmer Encyclopedia of Chemical Technology, Vol. 19, Interscience Publishers, New York, 1969, pp. 507–593, and Encyclopedia of Polymer Science and Technology, Vol. 13, Interscience Publishers, New York, 1970, pp. 477–486, both of which are incorporated herein by reference.

In the practice of the present invention, the photocurable coating compositions can be made by blending together the aqueous colloidal silica, the silyl acrylate, the polyfunctional acrylic monomer or mixtures thereof, the UV photosensitizer, and optionally any of the other aforementioned additives. In one blending procedure, the silyl acrylate can be hydrolyzed in the presence of aqueous colloidal silica and a water miscible alcohol. In another procedure the aqueous colloidal silica can be added to the silylacrylate which has been hydrolyzed in aqueous alcohol. Suitable alcohols include, for example, any water miscible alcohol, for example, methanol, ethanol, propanol, butanol, etc, or ether alcohols, such as ethoxyethanol, butoxyethanol, methoxypropanol, etc. In a further procedure, aqueous colloidal silica and the silylacrylate are combined and stirred until hydrolysis has been effected. The hydrolysis of the silylacrylate can be accomplished at ambient conditions, or can be effected by heating the hydrolysis mixture to reflux for a few minutes.

Although the order of addition of the various ingredients in the UV curable coating compositions of the present invention is not critical, it is preferred to add the polyfunctional acrylic monomer, or mixture thereof, to the above described mixture of hydrolyzed silyl acrylates and colloidal silica. Preferably, the polyfunctional acrylic monomer or mixtures thereof is added to the mixture of silyl acrylate and colloidal silica while it is stirring in a suitable hydrolysis medium, such as an aqueous solution of a water miscible alcohol as previously described.

In preparing the solventless UV curable hardcoat composition of the present invention, an azeotropic mixture of water and alcohol is distilled from the formulation. In instances where no alcohol was utilized in the initial hydrolysis mixture, sufficient alcohol can be added to facilitate the removal of water by distillation. Other solvents, for example, toluene, or other aromatic hydrocarbons, can be added to facilitate the removal of water.

It has been found that at least one part of silyl acrylate per 10 parts of $SiO_2$ should be used in the UV curable composition to minimize the formation of gel.

The hard coat compositions of the present invention are based on silicon-containing ingredients due to the condensation of colloidal silica and the silyl acrylate. A variation of the silicon content of the hardcoat composition has been found to influence such physical properties as the abrasion resistance of the resulting hardcoat. Additional properties, for example, the adhesion lifetime of the hardcoat on a thermoplastic substrate can also be enhanced by optimizing the formulation of the UV curable hardcoat composition. Suitable thermoplastic substrates which can be utilized in the practice of the present invention to produce shaped thermoplastic articles having enhanced abrasion resistance are, for example, Lexan polycarbonate, Valox polyester, Mylar polyester, Ultem polyetherimide, PPO polyphenyleneoxide, polymethylmethacrylate, etc., metals such as steel, aluminum, metallized thermoplastics, etc.

In order that those skilled in the art will be better able to practice the invention, the following examples are given by way of illustration and not by way of limitation. All parts are by weight.

EXAMPLE 1

A mixture was heated to reflux for 5 minutes consisting of 50 parts of tertiary butanol, 16.6 parts of Nalcoag 1034A, a product of the Nalco Company of Oak Brook, Ill., and 1 part of $v$-methacryloxypropyltrimethoxysilane (MAPTMS). After cooling, there was added 13.2 parts of a equal part mixture of hexanediol diacrylate in trimethylolpropane triacrylate. The solvent was distilled under reduced pressure. When about half of the solvent had distilled, an additional 30 parts of t-butanol was added. All of the solvent was then distilled to give a clear solution. There was then added to 100 parts of the mixture 1.5 parts of $\alpha,\alpha$-diethoxyacetophenone.

The above UV curable coating composition was then applied to a $4 \times 4\frac{1}{4}$ polycarbonate panel using a wire-wound bar. The treated panel was then UV cured in a model 1202AN UV processor, manufactured by the Pittsburgh Plate Glass Company, at a belt speed of 20 feet per minute, under a nitrogen flow of 20 scfm, at 100 psi. Adhesion testing of the resulting cured film was done by scribing the coated area with a Gitterschnittprufgerat cross-hatch cutter, applying Mystik 6432 tape to the cross-hatched area and rapidly pulling the tape from the cross-hatched area. Any coating removal by the tape constituted adhesive failure. Abrasion resistance was determined by measuring the change in haze (Δ%H) using a Gardner model UX10 haze meter before and after 300 cycles of abrasing on a model 174 Taber Abraser equipped with CS-10F wheels and 500 gm weights. Accelerated weathering was done by placing samples in a QUV device sold by the Q-Panel Company of Cleveland, Ohio, set to consecutive cycles of fluorescent UV light for 8 hours at 70° C. and 4 hours of high humidity at 50° C.

In addition to the above UV curable coating composition, additional compositions were prepared containing higher amounts of the MAPTMS and acrylate mixture. The following results were obtained as shown in Table I, which shows the results obtained from various UV curable coating compositions having a constant level of colloidal silica and various levels of acrylic monomers and MAPTMS, where the parts of MAPTMS and acrylic monomers are based on 6 parts by weight of $SiO_2$ and "Adhesion" and "Abrasion Resistance (Δ%H)" are as previously defined:

TABLE I

| Coating Formulations | | Properties of Coated Polycarbonate | |
|---|---|---|---|
| pbw MAPTMS: 6 pbw $SiO_2$ | pbw Acrylic Monomers | Adhesion | Abrasion Resistance, Δ % H |
| 1 | 13.2 | Pass | 6.0 |
| 2 | 12.6 | " | 7.5 |
| 4 | 11.2 | " | 7.3 |
| 6 | 10 | " | 6.9 |
| 8 | 8.4 | " | 6.6 |
| 12 | 5.6 | " | 5.9 |
| No Silane/ $SiO_2$ | 100 | " | 14.4 |

The above results show that abrasion resistance is substantially reduced when the MAPTMS and colloidal silica are eliminated from the mixture, while the adhesion is maintained, based on the acrylic monomer usage.

EXAMPLE 2

A mixture consisting of 300 parts of t-butanol, 12 parts of MAPTMS and 120 parts of Nalcoag 1034A was heated to reflux for 5 minutes and then allowed to cool to room temperature. There was added 46 parts of an equal part mixture of hexanedioldiacrylate and trimethylolpropane triacrylate to 72 parts of the aforedescribed solution after it was cooled. The solvent was then removed as in Example 1 resulting in the production of a clear solution. There was then added to 100 parts of the clear solution, 1.5 parts of α,α-diethoxyacetophenone resulting in the production of a UV curable coating composition.

The same procedure was repeated, except varying amounts of the acrylate mixture and Nalcoag 1034A were used. The following results were obtained utilizing the resulting compositions as a UV curable mixture on polycarbonate slabs, where "Adhesion" and "Abrasion Resistance" are as defined above in Example 1:

TABLE II

| Coating Formulations | | Properties of Coated Polycarbonate | |
|---|---|---|---|
| pbw Acrylic | $SiO_2$ | Adhesion | Abrasion Resistance Δ % H |
| 46 | 13 | Pass | 10.4 |
| 28 | 20 | " | 10.0 |
| 21 | 25 | " | 8.0 |
| 15 | 30 | " | 6.2 |
| 12 | 35 | " | 4.0 |
| 6 | 50 | " | 3.9 |

The above results show that an increase in the colloidal silica improves the abrasion resistance of the resulting cured coating while a wide variation in parts by weight of the acrylic resin in the curable formulation does not substantially affect the adhesion of the resulting cured film on the polycarbonate substrate.

EXAMPLE 3

A mixture was heated to reflux for 30 minutes with stirring consisting of 500 parts by weight of t-butanol, 30 parts by weight MAPTMS and 200 parts by weight of Nalcoag 1034A. The mixture was allowed to cool and then there was added 70 parts of trimethylolpropane triacrylate and 30 parts of 1,3-butyleneglycol diacrylate. The solvent was distilled under reduced pressure using a rotary evaporator and a hot water bath. A clear solution was obtained when all of the solvent had been distilled.

A UV curable composition was made by adding 1.5 part of α,α-diethoxyacetophenone to 100 parts of the above mixture. There were then added to the UV curable hardcoat formulation 5 parts of 2-ethylhexyl3,3-diphenyl-2-cyanoacrylate. Additional hardcoat formulations were prepared following the same procedure utilizing other UV absorbers. The respective UV curable mixtures containing the UV absorbers were then applied to polycarbonate panels as described in Example 1 and UV cured. The resulting coated panels were then tested for adhesion and abrasion resistance. In addition, an accelerated weathering test was also performed on each of the cured polycarbonate panels by placing the panels in a QUV device as described above, sold by the Q-Panel Company of Cleveland, Ohio. The polycarbonate panels were subjected to consecutive cycles of fluorescent UV light for 8 hours at 70° C. and 4 hours of high humidity at 50° C. The following results were obtained, where "UV absorber" is the compound added to the respective formulations, "Adhesion" and "Δ%H" are as previously defined and "QUV Adhesion" indicates the ability of the added stabilizer to impart improved weathering resistance to the cured coating.

TABLE III

| | Coating Properties | | |
|---|---|---|---|
| UV Absorber | Adhesion | Δ % $H^{300}$ | QUV Adhesion (hrs.) |
| no uv absorber | Pass | 4.3 | Fail 172 |
| 2-ethylhexyl 3,3-diphenyl-2-cyanoacrylate | " | 7.5 | Pass 219 |
| Resorcinol Monobenzoate | " | 7.2 | Pass 219 |
| 2-methyl resorcinol dibenzoate* | " | 6.5 | Pass 190 |

*Shown in the copending application RD-12772 of T.Y. Ching, assigned to the same assignee as the present invention.

The above results show that UV absorbers or stabilizers can substantially enhance the weatherability of cured coating compositions on thermoplastic substrates.

EXAMPLE 4

As shown in Example 2 of copending application of Rack Chung Ser. No. 217,719, a mixture of 520 parts of Nalcoag 1034A and 80 parts of 3-methacryloxypropyl trimethoxysilane was stirred for 1 hour at ambient temperatures. There were then added 500 parts of cellosolve and the solvents were removed under reduced pressure at 60° C. The thick residue is then dissolved in 32 parts of diethyleneglycoldiacrylate and 32 parts of trimethylolpropane triacrylate. The resulting material was then mixed with 8.5 parts of benzophenone, 9 parts of methyldiethanolamine, 42 parts of N-vinylpyrrolidone and 2 parts of BYK-300, a surface active agent made by Mallinkrodt. A polycarbonate Lexan panel was then treated with the resulting coating composition and the treated panel was then passed through a PPG QC1202 UV processor at a speed of 20 feet per minute. The coating composition was applied to a Lexan polycarbonate panel. The treated panel was then passed through a PPG QC1202 UV processor in air at a speed of 20 feet per minute. After 1 pass in an air atmosphere a hard cured clear coating was obtained. The coated Lexan polycarbonate panel passed the adhesion test of Example 1 and showed a %H500 of 4 and a %H1000 of 4.6.

Although the above examples are directed to only a few of the very many variables which can be utilized in making the UV curable compositions of the present invention, it should be understood that the UV curable compositions of the present invention include a much broader variety of silyl acrylates of formula (1), polyfunctional acrylate of formula (2) and colloidal silica as well as UV stabilizers which are shown in the description preceeding the examples.

What we claim as new and desire to secure by Letters Patent of the United States is:

1. A method for making a solventless hardcoat composition which comprises
   (1) agitating a mixture of a water miscible alcohol, colloidal silica and a silyl acrylate of the formula,

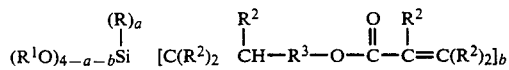

(2) adding acrylic monomer of the formula,

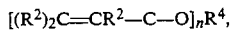

to the resulting mixture of (1) and
   (3) effecting removal of volatiles under reduced pressure from the mixture of (2) where R is a $C_{(1-13)}$ monovalent organic radical, $R^1$ is a $C_{(1-8)}$ alkyl radical, $R^2$ is selected from hydrogen, R and mixtures thereof, $R^3$ is $C_{(1-8)}$ alkylene, a is a whole number equal to 0-2 inclusive, b is an integer equal to 1-3 inclusive, and the sum of a+b is equal to 3 and n is an integer from 2 to 4 inclusive.

2. A method in accordance with claim 1, where a UV photoinitiator is added to the mixture.

3. A method in accordance with claim 1, where the silyl acrylate is $v$-methacryloxypropyltrimethoxysilane.

4. A method in accordance with claim 1, where the acrylate monomer is a mixture of hexanedioldiacrylate/trimethylolpropanetriacrylate.

5. A method in accordance with claim 2, where the photoinitiator is $\alpha,\alpha$-diethoxyacetophenone.

* * * * *